Patented Mar. 30, 1926.

1,578,327

UNITED STATES PATENT OFFICE.

BRUNO LAUCKNER, OF MARIENBERG, GERMANY.

METHOD OF MANUFACTURING COLORED PRESSED ARTICLES.

No Drawing.  Application filed April 3, 1925. Serial No. 20,559.

*To all whom it may concern:*

Be it known that I, BRUNO LAUCKNER, a citizen of the German Republic, and resident of Marienberg, Saxony, Germany, have invented a new Method of Manufacturing Colored Pressed Articles, of which the following is a specification.

The present invention relates to a method for the manufacture of patterned or decorated articles, such as handles or grips, latches for doors, electrical articles of use, knobs, counters or markers, knife-shells, and the like, and of coloring the respective articles, which are to be made, according to this invention, from materials employed already for similar purposes, but being too dense to permit the colors to penetrate thereinto. I am aware of the fact that articles of the kinds stated by way of example have already been made from plastic materials, such, for instance, as casein, horn- flour or -dust, blood, disintegrated cellulose-waste, or the like. The respective articles have been colored hitherto in this way that the respective colors or colored lacquers have been applied to the surface of the moulded or pressed article to be patterned or decorated with the aid of templates, the color being located, therefore, upon the surface of the article and being liable to get off it if not adhering sufficiently strongly to the base-substance.

The object of my invention is to obviate the just-mentioned drawback, and I attain this object by subjecting the moulded or shaped article first to a preliminary pressing operation, the respective material or substance being, at the time being, still in a condition in which the color can penetrate thereinto and adhere firmly thereto; hereinafter the article, i. e. the now colored and patterned or decorated article, is subjected to another, the final pressure, which is strong enough to produce that density the respective material or substance or mass must have in order to be able to stand the strains to which it will be subjected in practical use.

The improved method may be carried into practice as follows:

The articles to be made from the material or substance or mass such as pulverulent celluloid-waste or casein or b'ood, or the like, as already mentioned in the introductory part of this specification, are first moulded or shaped preliminarily under a slight pressure, which is so chosen that the respective color or colors or lacquers, etc., can penetrate into the surface of that material or substance or mass. Now the color or lacquer is applied to the surface of the article and permitted to penetrate thereinto, whereafter the colored and patterned or decorated article is subjected to the second or final pressing operation which is carried through in such a manner that the density of the material, etc., becomes now that necessary for the practical use of the article made. One succeeds in this way to manufacture articles of the kind mentioned, and of similar or other kinds, which, as regards the durability or stableness of the color, are as durable or stable as natural products.

I claim:

The method of manufacturing articles having a colored pattern or decoration from plastic masses such as pulverulent celluloid, horn- flour or -dust, or the like, which consists in giving to the article essentially its final shape by a preliminary moulding or shaping process while subjecting it to a relatively slight pressure, thereupon applying the coloring substances to the then relatively soft surface of said article, and thereupon subjecting said article with the coloring substances applied thereto to a further final pressing operation at a pressure which is essentially higher than that applied during said preliminary moulding or shaping process.

BRUNO LAUCKNER.